United States Patent [19]

Daniel et al.

[11] Patent Number: 6,127,471
[45] Date of Patent: *Oct. 3, 2000

[54] COATING SYSTEM COMPOSITION

[75] Inventors: Joseph E. Daniel, Houston; Steven W. Roeder, The Woodlands, both of Tex.

[73] Assignee: CarChalk, Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/942,524

[22] Filed: Oct. 2, 1997

Related U.S. Application Data

[63] Continuation of application No. 08/477,558, Jun. 7, 1995, abandoned.

[51] Int. Cl.[7] .............................. C08J 5/10; C08K 5/05; C08L 33/08
[52] U.S. Cl. .................... 524/386; 524/377; 524/378; 524/389; 524/497
[58] Field of Search .................................. 524/497, 377, 524/378, 386, 389

[56] References Cited

U.S. PATENT DOCUMENTS

| 5,066,710 | 11/1991 | Simonet et al. | 524/555 |
| 5,362,167 | 11/1994 | Loftin | 401/198 |
| 5,521,002 | 5/1996 | Sneed | 428/331 |

*Primary Examiner*—James J. Seidleck
*Assistant Examiner*—U. K. Rajguru
*Attorney, Agent, or Firm*—Christopher R. Benson

[57] ABSTRACT

A coating system compositions is disclosed. The composition comprises:

(a) about 40% to 50% wt. water;
(b) about 8% to 15% wt. resin;
(c) about 10% to 25% wt. pigmented dispersion;
(d) about 3% to 25% wt. opacifier;
(e) about 3% to 6% wt. solvent; and
(f) about 0.5 to 4% st. coating agent.

6 Claims, No Drawings

COATING SYSTEM COMPOSITION

This application is a continuation of application Ser. No. 08/477,558, filed Jun. 7, 1995 now abandoned.

SUMMARY OF THE INVENTION

This invention addresses the current problems by providing a composition that is easy to apply and remove. The composition is a liquid plastic coating that dries upon application into a thin film. The composition comprises as its principal constituents, water, pigmented dispersion, solvent, opacifiers, and glycol monomers and polymers. The preferred embodiment comprises about 45 to 50% by weight water, about 8 to 15% by weight resin, about 10 to 25% by weight pigmented dispersion, about 15% to 25% by weight opacifier such as titanium dioxide, about 1 to 5% by weight polypropylene glycol and about 3 to 6% solvent such as propylene glycol.

The composition of the present invention provides a uniform, colored film on both flexible and rigid substrates. In its presently preferred use, the composition is applied as a thin film to glass, plastic or similar transparent substrate. It is permitted to air dry to form a film which usually occurs within about 30 seconds to 3 minutes, depending on ambient conditions.

Thin film means a pigment dispersed in semi-opaque or opaque layers. These films can also be used to coat surfaces of all types. For example, the composition may be applied to flat surfaces such as glass or plastic sheets, or irregular surfaces such as rocks. The composition is also resistant to rain but may be removed easily by a wet cloth.

DETAILED DESCRIPTION

The present invention comprises 6 basic ingredients:
(1) Water;
(2) Resin;
(3) Pigmented dispersion;
(4) Opacifier;
(5) Solvent; and
(6) Coating agent.

The resin component comprises about 8 to 15% by weight of the composition. The preferred resin is a low weight acrylic/latex base resin. The preferred resin is WWA-99 from Wonder Works of America in Brooklyn, N.Y.

The pigmented dispersion component comprises about 10 to 25% by weight of the composition. This component is present as a dispersion, and is not added as a dry powder, to aid in miscibility. Additionally, since the pigmented dispersions are added as a dispersion, the pigmented dispersion solvent package must be compatible with the aqueous base package comprising the remainder of the solution (i.e. water, glycol). The preferred pigmented dispersions are Luconyl or Dispers both of which are dispersions available from BASF.

The preferred opacifier is Titanium Dioxide (CAS #13463-67-7). Its percentage of weight to the composition is dependent upon the pigmented dispersion color desired. The percentage weight for most colors is 15 to 25%. However, red requires about 3% to 5% opacifier and about 15% calcium carbonate (CAS #1317-65-3).

The solvent component comprises about 3 to 6% by weight of the composition. The preferred solvent is propylene glycol (CAS #57-55-6). Propylene glycol aids in the flow characteristics of the solution.

The coating agent comprises about 0.5 to 4% by weight of the composition. Polypropylene glycol (CAS #025322-69-4) is the preferred coating agent that forms a protective coating over the rest of the composition when applied.

Water comprises the balance of the composition and preferably about 40 to 50% by weight. Greater water concentrations result in a less viscous liquid, which compromises the application capabilities of the fluid to vertical surfaces. Conversely, lesser water concentrations result in a more viscous liquid, which causes application problems of flow through a sponge applicator. The composition is routinely applied as a thin film, and the water is allowed to evaporate. The resultant coating after evaporation is resistant to rain. The composition is readily miscible with water, and is easily removed from the glass substrate with a hand towel and water or a slightly basic aqueous solution.

The following examples are presented to show the preferred composition. They are not intended to limit the scope or content of the invention or disclosure.

EXAMPLE 1

(1) about 46% wt. water
(2) about 18% wt. pigmented dispersion
(3) about 18% wt. titanium dioxide
(4) about 12% wt. resin
(5) about 5% wt. propylene glycol
(6) about 1% wt. polypropolene glycol

EXAMPLE 2

(1) about 43% wt. water
(2) about 22% wt. pigmented dispersion
(3) about 15% wt. calcium carbonate
(4) about 4% wt. titanium dioxide
(5) about 11% wt. resin
(6) about 4% wt. propylene glycol
(7) about 1% wt. polypropolene glycol The preferred compositions may be made by simply mixing the ingredients. Preferably, the compositions are made by mixing the components in the order listed. The components of the mixture are blended at ambient temperature by stirring to form a homogenous fluid.

What is claimed is:

1. A composition comprising:
   (a) about 40% to 50% wt. water;
   (b) about 8% to 15% wt. resin;
   (c) about 10% to 25% wt. pigmented dispersion;
   (d) about 3% to 25% wt. opacifier;
   (e) about 3% to 6% wt. solvent; and
   (f) about 0.5 to 4% wt. coating agent.

2. A composition according to claim 1 where the opacifier (d) is titnium dioxide.

3. A composition according to claim 1 where the solvent (e) is propylene glycol.

4. A composition according to claim 1 where the coating agent (f) is polypropylene glycol.

5. A composition comprising:
   (a) about 46% wt. water;
   (b) about 18% wt. pigmented dispersion;

(c) about 19% wt. titanium dioxide;
(d) about 12% wt. resin;
(e) about 5% wt. propylene glycol; and
(f) about 1% wt. polypropylene glycol.

6. A composition comprising:
(a) about 43% wt. water;
(b) about 22% wt. pigmented dispersion;
(c) about 15% wt. calcium carbonate;
(d) about 4% wt. titanium dioxide;
(e) about 11% wt. resin;
(f) about 4% wt. propylene glycol; and
(g) about 1% wt. polyproylene glycol.

* * * * *